Dec. 4, 1928.
M. E. GEBEL
1,694,256
ELECTRIC SOLDERING CARBON
Filed March 30, 1928
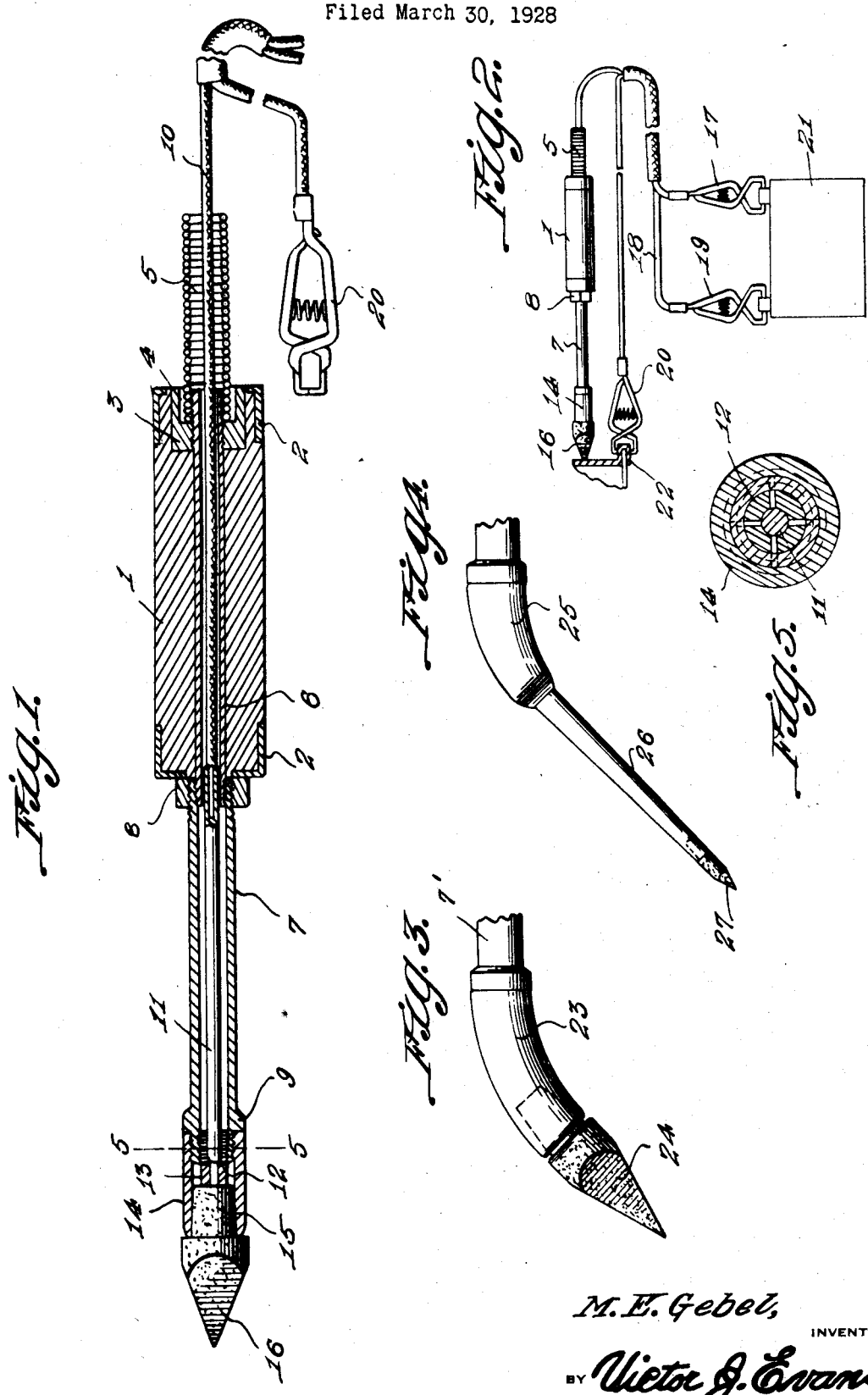
M. E. Gebel,
INVENTOR
BY Victor J. Evans
ATTORNEY Patented Dec. 4, 1928.

1,694,256

UNITED STATES PATENT OFFICE.

MICHAEL E. GEBEL, OF ARMOUR, SOUTH DAKOTA.

ELECTRIC SOLDERING CARBON.

Application filed March 30, 1928. Serial No. 266,011.

My present invention has reference to an electric soldering iron in which a stick of carbon is employed as the soldering point, and in which the carbon is heated by a source of electricity obtained from a battery and also in which the return wire to the battery is clamped upon the article being soldered, and my primary object is the provision of an article for this purpose that shall be of a simple construction, may be safely and conveniently used, and wherein the soldering points may be arranged at varying points with respect to the handle and stem of the improvement so that solder may be applied to the parts of articles that are inaccessible to the ordinary soldering iron.

A further object is the provision of a novel clutch for clamping one of the conductors in a position to properly contact with the soldering point, together with a novel chuck for securing the point on the improvement.

Other important objects will present themselves as the nature is better understood, reference being had to the accompanying drawings which form part of this application.

In the drawings;

Figure 1 is a substantially central longitudinal sectional view through the improvement.

Figure 2 is a side elevation illustrating the manner in which the improvement is used.

Figure 3 is a detail view showing a curved chuck screwed on the stem of the iron to arrange a carbon point at an angle with respect to the longitudinal plane of the iron.

Figure 4 is a similar view illustrating a further modification.

Figure 5 is a sectional view approximately on the line 5—5 of Figure 1.

Referring now to the drawings in detail, the numeral 1 designates the handle of the improvement. The handle is of some suitable insulating material, wood for instance. The handle has its ends reinforced by metal ferrules 2 which are flanged to contact with both the body and ends of the said handle. Let in one end of the handle there is a sleeve member 3. The sleeve is interiorly threaded but has its outer portion enlarged to provide a pocket 4 for a closely wound wire guard 5. There is screwed through the threaded portion of the sleeve 3 and received in the pocket 4 a metal tube 6. The guard 5 is screwed on the projecting end of this tube and on the outer end of said tube there is screwed the hollow stem 7 of the improvement. The stem is held on the tube by a lock nut 8 which is screwed on the said stem and disposed opposite the end of the tube.

The outer end of the stem is both interiorly and exteriorly threaded, the exterior threads merging into an enlarged or shoulder portion 9.

Passing through the guard 5 and tube 6 there is an encased conductor 10 and fixed to this conductor and extending through the hollow stem 7 there is a metal rod 11 which is preferably of copper. The rod 11 is extended into the threaded end of the stem 7, and there is screwed in the said threaded end a plug 12. The plug has a central bore therethrough and from its outer end 13 the said plug is slitted longitudinally at right angles. The plug is thus in the nature of a clutch member. The plug is slightly tapered as is the inner threaded portion of the stem 7. The plug is of metal and, therefore, a conductor of electricity. The plug when screwed home effectively clutches the rod 11.

Screwed upon the exterior portion of the outer end of the stem 7 there is a chuck sleeve 14 and this sleeve is designed to have received therein and to frictionally engage therewith the inner and reduced conical end 15 of a carbon point 16.

The encased conductor 10 has on its outer end a spring clip or clamp 17. The second encased conductor is indicated by the numeral 18 and has both of its ends provided with spring clips 19 and 20, respectively, which are similar to the spring clip 17. A portion of the conductor 18 has its casing wound with or otherwise secured to a part of the conductor 10. The clips 17 and 19 are designed to be clamped upon the poles of a battery 21 and the clip 20 is designed to be clamped on the edge of an article 22 to be soldered. As soon as the carbon is brought against the article 22 the circuit will be completed and the carbon point 16 will be heated to a point to melt the solder and thereby permit of the soldering operation. In Figure 3 a chuck 23 is screwed on the end of the stem 7' for the handle. This chuck is curved or arched and has arranged therein the conical end of a soldering carbon 24. This permits of the soldering point 24 being arranged at an angle with respect to the handle 6 so that the point may be arranged to solder articles which are inaccessible to ordinary soldering irons.

In Figure 4 the chuck member 25 is also curved but has extended therefrom a tubular portion 26 in which the reduced end of the carbon point 27 is received.

The simplicity of my improvement, the construction thereof and the advantages will, it is thought, be understood and appreciated by those skilled in the art when the foregoing description has been carefully read in connection with the accompanying drawing, but obviously I do not wish to be restricted to the precise details as herein set forth and, therefore, hold myself entitled to make such changes therefrom as fairly fall within the scope of what I claim.

Having described the invention, I claim:

1. A carbon point electric soldering iron, including an insulator handle having a tube extending longitudinally therethrough, a hollow stem on one end of the tube, an electric conductor received in the tube, a metal rod thereon received in the stem, a metal split clutch member screwed in the outer end of the sleeve and clamping the rod, a chuck sleeve screwed on the stem and designed to receive therein one end of a carbon point which contacts with the clutch, said conductor having a spring clamp on the outer end thereof and a second conductor having spring clips on both of its ends.

2. A carbon point electric soldering iron including an insulator handle having a tube extending longitudinally therethrough, a sleeve in one end of the handle screwed on the tube, a flexible guard received in the sleeve and screwed on the said end of the tube, a hollow metal stem screwed on the second end of the tube, a lock nut screwed on the stem for sustaining the same on the tube, a conductor received through the guard and tube, a metal rod fixed on one end of the conductor and received in the stem, a metal split clutch member screwed in the end of the sleeve and clamping the rod, a chuck sleeve screwed on the stem, and designed to receive therein one end of a carbon point which contacts with the clutch, said conductor having a spring clamp on the outer end thereof and a second conductor having spring clips on both of its ends.

In testimony whereof I affix my signature.

MICHAEL E. GEBEL.